United States Patent
Fukuta (10) Patent No.: US 10,015,714 B2
(45) Date of Patent: Jul. 3, 2018

(54) NETWORK SELECTION CONTROL METHOD, BASE STATION, AND USER TERMINAL

(71) Applicant: KYOCERA CORPORATION, Kyoto (JP)

(72) Inventor: Noriyoshi Fukuta, Inagi (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/118,519

(22) PCT Filed: Feb. 13, 2015

(86) PCT No.: PCT/JP2015/053910
§ 371 (c)(1),
(2) Date: Aug. 12, 2016

(87) PCT Pub. No.: WO2015/125698
PCT Pub. Date: Aug. 27, 2015

(65) Prior Publication Data
US 2017/0223595 A1    Aug. 3, 2017

(30) Foreign Application Priority Data

Feb. 20, 2014 (JP) ................................ 2014-030469

(51) Int. Cl.
*H04L 5/12* (2006.01)
*H04W 36/22* (2009.01)
(Continued)

(52) U.S. Cl.
CPC ....... *H04W 36/22* (2013.01); *H04W 36/0061* (2013.01); *H04W 36/0066* (2013.01);
(Continued)

(58) Field of Classification Search
CPC .......................... H04W 28/0289; H04W 36/22
(Continued)

(56) References Cited

U.S. PATENT DOCUMENTS

2012/0009972 A1    1/2012    Viering et al.
2012/0263145 A1    10/2012    Marinier et al.
(Continued)

FOREIGN PATENT DOCUMENTS

JP    2009-212847 A    9/2009
JP    2009-535968 A    10/2009

OTHER PUBLICATIONS

Extended European Search Report (EESR) dated Jul. 21, 2017, from corresponding EP Appl No. 15752605.4, 7 pp.
(Continued)

*Primary Examiner* — Iqbal Zaidi
(74) *Attorney, Agent, or Firm* — Studebaker & Brackett PC (57) ABSTRACT

A network selection control method is a method for selecting, from a E-UTRAN and a WLAN, an access network in which a traffic of a UE 100 is transmitted and received. The network selection control method comprises the steps of: transmitting, by a cell #1 in the E-UTRAN, offload control information to a UE 100-1 that exists in the cell #1, the offload control information being for requesting switching of an access network in which the traffic of the UE 100-1 is transmitted and received, to the WLAN; and transmitting, by a cell #2 neighboring the cell #1 in the E-UTRAN, to a UE 100-2 that exists in the cell #2, neighboring cell offload information indicating that the offload control information is transmitted in the cell #1.

11 Claims, 8 Drawing Sheets

(51) Int. Cl.
  *H04W 36/14* (2009.01)
  *H04W 36/00* (2009.01)
  H04W 84/04 (2009.01)
  H04W 84/12 (2009.01)

(52) U.S. Cl.
  CPC .......... *H04W 36/14* (2013.01); *H04W 84/042* (2013.01); *H04W 84/12* (2013.01)

(58) Field of Classification Search
  USPC .................................................. 370/230–339
  See application file for complete search history.

(56) References Cited

U.S. PATENT DOCUMENTS

| | | | |
|---|---|---|---|
| 2012/0294149 A1 | 11/2012 | Kazmi et al. | |
| 2015/0195759 A1* | 7/2015 | Sirotkin | H04W 8/005 370/331 |
| 2017/0245252 A1* | 8/2017 | Gao | H04W 72/042 |

OTHER PUBLICATIONS

International Search Report issued in PCT/JP2015/053910; dated May 19, 2015.

Written Opinion issued in PCT/JP2015/053910; dated May 19, 2015.

3rd Generation Partnership Project; Technical Specification Group Radio Access Network; Study on Wireless Local Area Network (WLAN)—3GPP radio interworking; 3GPP TR 37.834 V12.0.0; Dec. 2013; pp. 1-17; Release 12; 3GPP Organizational Partners.

LG Electronics Inc., Kyocera; Text proposal on WLAN 3GPP radio interworking solution 2; 3GPP TSG-RAN2 Meeting #83; R2-132849; Aug. 19-23, 2013; Barcelona, Spain.

NEC Corporation; Open issues of solution 1; 3GPP TSG RAN2 Meeting #83b; R2-133426; Oct. 7-11, 2013; Ljubljana, Slovenia.

* cited by examiner

NETWORK SELECTION CONTROL METHOD, BASE STATION, AND USER TERMINAL

TECHNICAL FIELD

The present invention relates to a base station, a user terminal, and a network selection control method for selecting, from a cellular RAN and a wireless LAN, an access network in which the traffic of the user terminal is transmitted and received.

BACKGROUND ART

In recent years, the use of a user terminal (what is termed as a dual terminal) having both functions of cellular communication and wireless LAN (Local Area Network) communication is increasingly becoming popular. Further, the number of wireless LAN access points managed by an operator of a cellular communication system is increasing. Therefore, in 3GPP (3rd Generation Partnership Project) which is a project aiming to standardize a cellular communication system, a technology is being considered which is capable of strengthening linkage between a cellular RAN (Radio Access Network) and a wireless LAN.

For example, when switching is performed so that the traffic of a user terminal accommodated in a cellular RAN is accommodated in a wireless LAN, the traffic load of the cellular RAN can be reduced (offload). Further, as a network selection scheme of selecting, from the cellular RAN and the wireless LAN, an access network in which the traffic of a user terminal is transmitted and received, a plurality of schemes have been proposed (see Non Patent Literature 1).

CITATION LIST

Non Patent Literature

[NPL 1] 3GPP technical report "TR 37. 834 V12. 0. 0" December, 2013

SUMMARY

A network selection control method according to a first aspect is a method for selecting, from a cellular RAN and a wireless LAN, an access network in which a traffic of a user terminal is transmitted and received. The network selection control method comprises the steps of: transmitting, by a first cell in the cellular RAN, offload control information to a first user terminal that exists in the first cell, the offload control information being for requesting switching of an access network in which the traffic of the first user terminal is transmitted and received, to the wireless LAN; and transmitting, by a second cell neighboring the first cell in the cellular RAN, to a second user terminal that exists in the second cell, neighboring cell offload information indicating that the offload control information is transmitted in the first cell.

A base station according to a second aspect manages a first cell in a cellular RAN. The base station comprises: a transmitter configured to transmit, offload control information to a first user terminal that exists in the first cell, the offload control information being for requesting switching of an access network in which the traffic of the first user terminal is transmitted and received, to the wireless LAN; and a controller configured to notify, to a second base station that manages a second cell neighboring the first cell in the cellular RAN, start of transmission of the offload control information.

A base station according to a third aspect manages a second cell neighboring a first cell in a cellular RAN. The base station comprises: a transmitter configured to transmit, to a second user terminal that exists in the second cell, neighboring cell offload information indicating that offload control information is transmitted in the first cell. The offload control information is information for requesting, to a first user terminal that exists in the first cell, switching of an access network in which the traffic of the first user terminal is transmitted and received, to the wireless LAN.

A user terminal according to a fourth aspect exists in a second cell neighboring a first cell in a cellular RAN. The user terminal comprises: a receiver configured to receive, from the second cell, neighboring cell offload information indicating that offload control information is transmitted in the first cell; and a controller configured to start an offload-related process for switching an access network in which the traffic of the user terminal itself is transmitted and received, to the wireless LAN, on the basis of reception of the neighboring cell offload information. The offload control information is information for requesting, to a first user terminal that exists in the first cell, switching of an access network in which the traffic of the first user terminal is transmitted and received, to the wireless LAN.

BRIEF DESCRIPTION OF DRAWINGS

FIGS. 9 (a) to 9 (c) are diagrams for describing a modification of the embodiment.

DESCRIPTION OF EMBODIMENTS

Among the above-described network selection schemes, there is a scheme by which a user terminal performs an offload-related process for switching an access network in which the traffic of the user terminal is transmitted and received, to a wireless LAN, on the basis of offload control information transmitted from a cellular-RAN base station (cell).

It is believed that in such a scheme, a single cell that transmits the offload control information is in a crowded state. Thus, it is preferred that another cell neighboring the single cell starts an offload-related process in a user terminal at a stage prior to a handover performed by the user terminal from the other cell to the single cell.

Therefore, an object of the present invention is to provide a base station, a user terminal, and a network selection control method by which an offload-related process can be appropriately controlled.

Overview of Embodiment

A network selection control method according to an embodiment is a method for selecting, from a cellular RAN and a wireless LAN, an access network in which a traffic of a user terminal is transmitted and received. The network selection control method comprises the steps of: transmitting, by a first cell in the cellular RAN, offload control information to a first user terminal that exists in the first cell, the offload control information being for requesting switching of an access network in which the traffic of the first user terminal is transmitted and received, to the wireless LAN; and transmitting, by a second cell neighboring the first cell in the cellular RAN, to a second user terminal that exists in the second cell, neighboring cell offload information indicating that the offload control information is transmitted in the first cell.

In the embodiment, the network selection control method further comprises a step of starting an offload-related process for switching an access network in which the traffic of the second user terminal is transmitted and received, to the wireless LAN, on the basis of reception of the neighboring cell offload information by the second user terminal.

In the embodiment, the network selection control method further comprises a step of transmitting, by a first base station that manages the first cell, to a second base station that manages the second cell, a notification concerning the start of transmission of the offload control information. In response to the reception of the notification, the second base station starts the transmission of the neighboring cell offload information from the second cell.

In a modification of the embodiment, a first base station that manages the first cell is a base station other than a home base station.

In a modification of the embodiment, a second base station that manages the second cell is a home base station.

In an operation pattern 1 according to the embodiment, in the step of transmitting the neighboring cell offload information, the second cell transmits the neighboring cell offload information by a broadcast signal.

In the operation pattern 1 according to the embodiment, the network selection control method further comprises a step of transmitting, by the second cell, a threshold value for starting an offload-related process for switching an access network in which the traffic of the second user terminal is transmitted and received, to the wireless LAN, together with the neighboring cell offload information. The threshold value is compared to a received power from the first cell in the second user terminal.

In an operation pattern 2 according to the embodiment, in the step of transmitting the neighboring cell offload information, the second cell transmits the neighboring cell offload information to the second user terminal that satisfies a predetermined condition, by a unicast signal.

In the operation pattern 2 according to the embodiment, the network selection control method further comprises the steps of: receiving, by the second cell, from the second user terminal, a measurement report including a measurement result for the first cell; determining, by the second cell, whether or not the second user terminal satisfies the predetermined condition, on the basis of the measurement report; and transmitting, by the second cell, to the second user terminal, an instruction for an offload-related process for switching an access network in which the traffic of the second user terminal is transmitted and received, to the wireless LAN, as the neighboring cell offload information, when the predetermined condition is satisfied. The predetermined condition is any one of the fact that a handover is performed from the second cell to the first cell and the fact that the probability of performing the handover is high.

A base station according to the embodiment manages a first cell in a cellular RAN. The base station comprises: a transmitter configured to transmit, offload control information to a first user terminal that exists in the first cell, the offload control information being for requesting switching of an access network in which the traffic of the first user terminal is transmitted and received, to the wireless LAN; and a controller configured to notify, to a second base station that manages a second cell neighboring the first cell in the cellular RAN, start of transmission of the offload control information.

A base station according to the embodiment manages a second cell neighboring a first cell in a cellular RAN. The base station comprises: a transmitter configured to transmit, to a second user terminal that exists in the second cell, neighboring cell offload information indicating that offload control information is transmitted in the first cell. The offload control information is information for requesting, to a first user terminal that exists in the first cell, switching of an access network in which the traffic of the first user terminal is transmitted and received, to the wireless LAN.

A user terminal according to the embodiment exists in a second cell neighboring a first cell in a cellular RAN. The user terminal comprises: a receiver configured to receive, from the second cell, neighboring cell offload information indicating that offload control information is transmitted in the first cell; and a controller configured to start an offload-related process for switching an access network in which the traffic of the user terminal itself is transmitted and received, to the wireless LAN, on the basis of reception of the neighboring cell offload information. The offload control information is information for requesting, to a first user terminal that exists in the first cell, switching of an access network in which the traffic of the first user terminal is transmitted and received, to the wireless LAN.

Embodiment

An embodiment in which an LTE system, which is a cellular communication system configured in compliance with the 3GPP standards, is linked with a wireless LAN (WLAN) system will be described below with reference to drawings.

(System Configuration)

Figure 1:
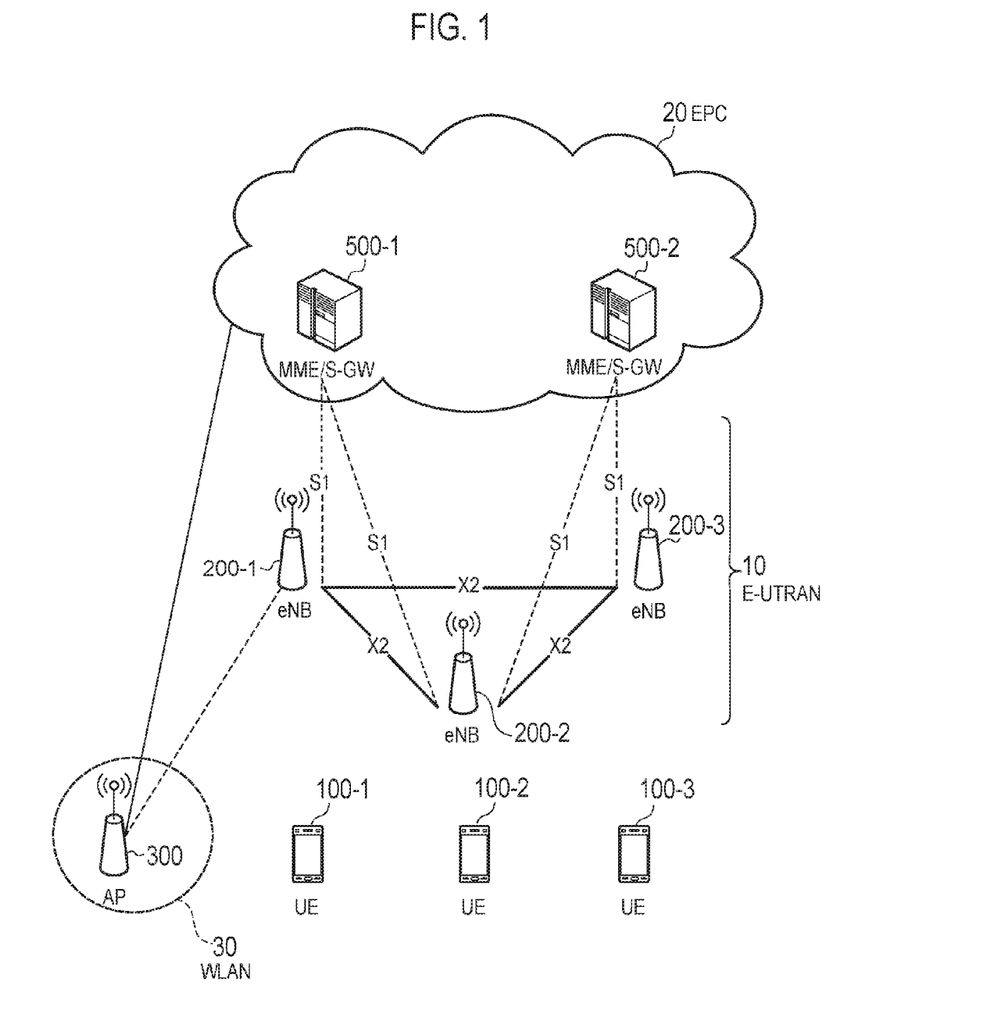
FIG. 1 is a system configuration diagram according to an embodiment.

FIG. 1 is a system configuration diagram according to the embodiment. As shown in FIG. 1, the LTE communication system includes a plurality of UEs (User Equipments) 100, an E-UTRAN (Evolved-UMTS Terrestrial Radio Access Network) 10, and an EPC (Evolved Packet Core) 20.

The E-UTRAN 10 corresponds to a cellular RAN. The EPC 20 corresponds to a core network. The E-UTRAN 10 and the EPC 20 configure a network of the LTE communication system.

The UE 100 is a mobile radio communication device and performs radio communication with a cell with which a connection is established. The UE 100 corresponds to the user terminal. The UE 100 is a terminal (dual terminal) that supports both cellular communication scheme and WLAN communication scheme.

The E-UTRAN 10 includes a plurality of eNBs 200 (evolved Node-Bs). The eNB 200 corresponds to a cellular base station. The eNB 200 manages one or a plurality of cells and performs radio communication with the UE 100 which establishes a connection with the cell of the eNB 200.

It is noted that the "cell" is used as a term indicating a minimum unit of a radio communication area, and is also used as a term indicating a function of performing radio communication with the UE 100. Further, the eNB 200 has a radio resource management (RRM) function, a routing function of user data, and a measurement control function for mobility control and scheduling, for example.

The eNBs 200 are connected mutually via an X2 interface. Further, the eNB 200 is connected to MME (Mobility Management Entity)/S-GW (Serving-Gateway) 500 included in the EPC 20 via an S1 interface.

The EPC 20 includes a plurality of MMEs/S-GWs 500. The MME is a network node for performing various mobility controls, for example, for the UE 100, and corresponds to a controller. The S-GW is a network node that performs transfer control of user data and corresponds to a mobile switching center.

WLAN 30 includes a WLAN access point (hereinafter, briefly referred to as "AP") 300. The AP 300 is an AP (Operator controlled AP) managed by a network operator of a LTE communication system, for example.

The WLAN 30 is configured to comply with standards of IEEE 802.11, for example. The AP 300 communicates with the UE 100 in a frequency band (WLAN frequency band) different from a cellular frequency band. The AP 300 is connected via a router, etc., to the EPC 20.

Further, it is not limited to the case where the eNB 200 and the AP 300 are separately disposed. The eNB 200 and the AP 300 may be arranged in the same place (Collocated). As one mode of the Collocated, the eNB 200 and the AP 300 may be directly connected to each other through any interface of an operator.

The EPC 20 may further include an ANDSF (Access Network Discovery and Selection Function) server. The ANDSF server manages ANDSF information on the WLAN 30. The ANDSF server provides the UE 100 with the ANDSF information on the WLAN 30, by an NAS (Non Access Stratum) message.

Figure 2:
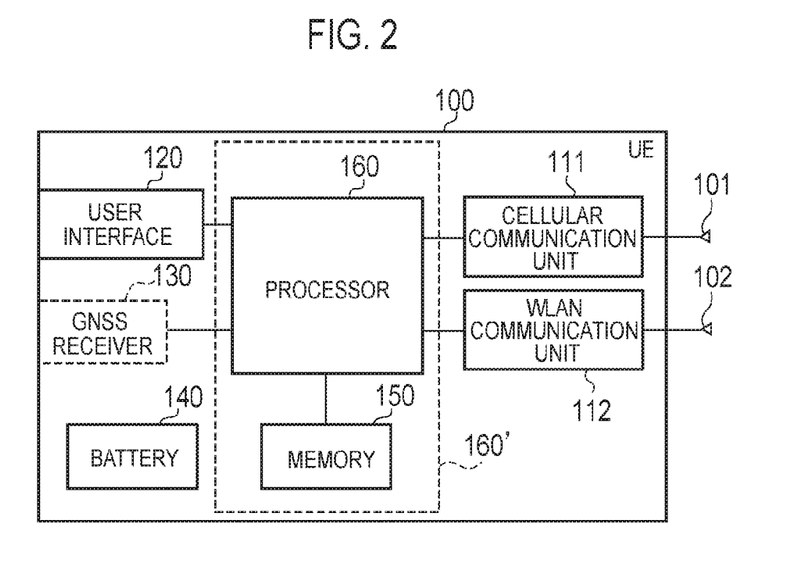
FIG. 2 is a block diagram of a UE according to the embodiment.
Figure 3:
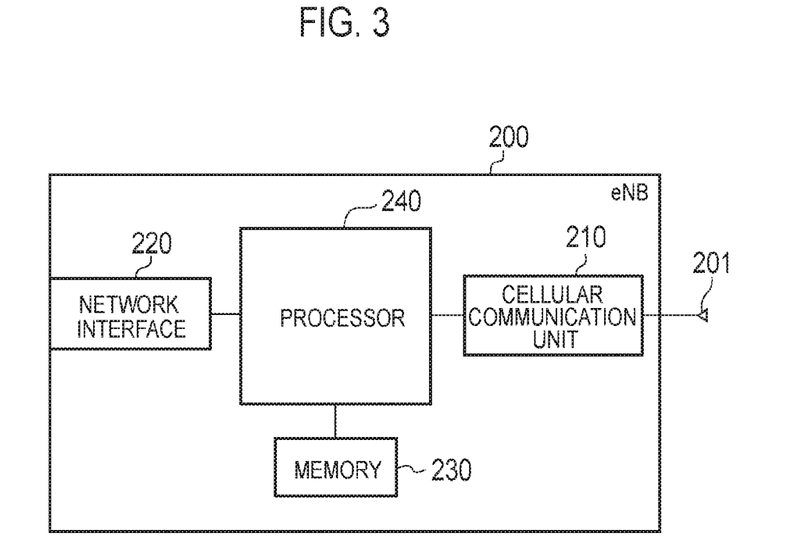
FIG. 3 is a block diagram of an eNB according to the embodiment.

Subsequently, a configuration of the UE 100 and the eNB 200 will be described.

FIG. 2 is a block diagram of the UE 100. As shown in FIG. 2, the UE 100 includes: antennas 101 and 102; a cellular communication unit 111; a WLAN communication unit 112; a user interface 120; a GNSS (Global Navigation Satellite System) receiver 130; a battery 140; a memory 150; and a processor 160. The memory 150 and the processor 160 configure a control unit. The UE 100 may not have the GNSS receiver 130. It is noted that the memory 150 may be integrally formed with the processor 160, and this set (that is, a chipset) may be called a processor 160'.

The antenna 101 and the cellular communication unit 111 are used for transmitting and receiving a cellular radio signal. The cellular communication unit 111 converts a baseband signal output from the processor 160 into the cellular radio signal, and transmits the same from the antenna 101. Further, the cellular communication unit 111 converts the cellular radio signal received by the antenna 101 into the baseband signal, and outputs the same to the processor 160.

The antenna 102 and the WLAN communication unit 112 are used for transmitting and receiving a WLAN radio signal. The WLAN communication unit 112 converts the baseband signal output from the processor 160 into a WLAN radio signal, and transmits the same from the antenna 102. Further, the WLAN communication unit 112 converts the WLAN radio signal received by the antenna 102 into a baseband signal, and outputs the same to the processor 160.

The user interface 120 is an interface with a user carrying the UE 100, and includes, for example, a display, a microphone, a speaker, and various buttons. Upon receipt of the input from a user, the user interface 120 outputs a signal indicating a content of the input to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for a process by the processor 160. The processor 160 includes the baseband processor that performs modulation and demodulation, and encoding and decoding on the baseband signal and a CPU that performs various processes by executing the program stored in the memory 150. The processor 160 may further include a codec that performs encoding and decoding on sound and video signals. The processor 160 executes various processes and various communication protocols described later.

FIG. 3 is a block diagram of the eNB 200. As shown in FIG. 3, the eNB 200 includes an antenna 201, a cellular communication unit 210, a network interface 220, a memory 230, and a processor 240. The memory 230 and the processor 240 configure a control unit. It is noted that the memory 230 may be integrally formed with the processor 240, and this set (that is, a chipset) may be called a processor. Further, the memory 230 may be integrally formed with the processor 240, and this set (that is, a chipset) may be called a processor 240'.

The antenna 201 and the cellular communication unit 210 are used for transmitting and receiving a cellular radio signal. The cellular communication unit 210 converts the baseband signal output from the processor 240 into the cellular radio signal, and transmits the same from the antenna 201. Furthermore, the cellular communication unit 210 converts the cellular radio signal received by the antenna 201 into the baseband signal, and outputs the same to the processor 240.

The network interface 220 is connected to the neighboring eNB 200 via an X2 interface and is connected to the MME/S-GW 500 via the S1 interface.

The memory 230 stores a program to be executed by the processor 240 and information to be used for a process by the processor 240. The processor 240 includes the baseband processor that performs modulation and demodulation, encoding and decoding and the like on the baseband signal and a CPU that performs various processes by executing the program stored in the memory 230. The processor 240 implements various processes and various communication protocols described later.

Figure 4:
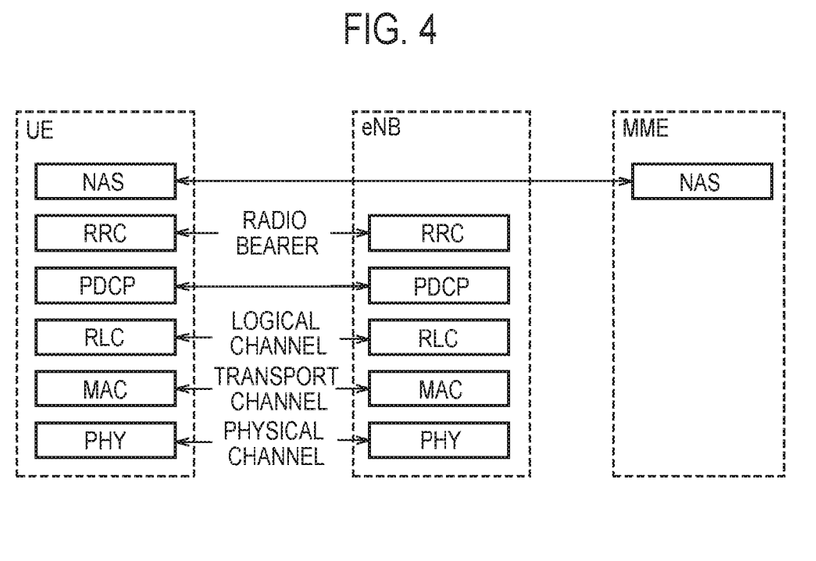
FIG. 4 is a protocol stack diagram of a radio interface.

FIG. 4 is a protocol stack diagram of a radio interface in the LTE system. As shown in FIG. 4, the radio interface protocol is classified into a layer 1 to a layer 3 of an OSI reference model, wherein the layer 1 is a physical (PHY) layer. The layer 2 includes a MAC (Medium Access Control) layer, an RLC (Radio Link Control) layer, and a PDCP (Packet Data Convergence Protocol) layer. The layer 3 includes an RRC (Radio Resource Control) layer.

The PHY layer performs encoding and decoding, modulation and demodulation, antenna mapping and demapping, and resource mapping and demapping. Between the PHY layer of the UE 100 and the PHY layer of the eNB 200, user data and a control signal are transmitted via the physical channel.

The MAC layer performs priority control of data, and a retransmission process and the like by hybrid ARQ (HARQ). Between the MAC layer of the UE 100 and the MAC layer of the eNB 200, user data and a control signal are transmitted via a transport channel. The MAC layer of the eNB 200 includes a scheduler for determining a transport format (a transport block size, a modulation and coding scheme and the like) of an uplink and a downlink, and an allocated resource block to the UE 100.

The RLC layer transmits data to an RLC layer of a reception side by using the functions of the MAC layer and the PHY layer. Between the RLC layer of the UE 100 and the RLC layer of the eNB 200, data is transmitted via a logical channel.

The PDCP layer performs header compression and decompression, and encryption and decryption.

The RRC layer is defined only in a control plane handling a control signal. Between the RRC layer of the UE 100 and the RRC layer of the eNB 200, the control signal (an RRC message) for various types of setting is transmitted. The RRC layer controls the logical channel, the transport channel, and the physical channel in response to establishment, re-establishment, and release of a radio bearer. When there is a connection (RRC connection) between the RRC of the UE 100 and the RRC of the eNB 200, the UE 100 is in an RRC connected state, otherwise, the UE 100 is in an RRC idle state.

A NAS (Non-Access Stratum) layer positioned above the RRC layer performs session management or mobility management, for example. MME/S-GW 500 and the ANDSF server transmit and receive a NAS message to/from the UE 100.

Further, in the LTE system, OFDMA (Orthogonal Frequency Division Multiple Access) is applied to a downlink, and SC-FDMA (Single Carrier Frequency Division Multiplexing Access) is applied to an uplink, respectively.

The radio frame is configured by 10 subframes arranged in a time direction, wherein each subframe is configured by two slots arranged in the time direction. Each subframe has a length of 1 ms and each slot has a length of 0.5 ms. Each subframe includes a plurality of resource blocks (RB) in a frequency direction, and a plurality of symbols in the time direction. The resource block includes a plurality of subcarriers in the frequency direction. Among radio resources (time-frequency resources) assigned to the UE 100, a frequency resource can be specified by a resource block and a time resource can be specified by a subframe (or slot).

In the downlink, an interval of several symbols at the head of each subframe is a control region used as a physical downlink control channel (PDCCH) for mainly transmitting a control signal. Furthermore, the other portion of each subframe is a region available as a physical downlink shared channel (PDSCH) for mainly transmitting user data.

In the uplink, both ends in the frequency direction of each subframe are control regions used as a physical uplink control channel (PUCCH) for mainly transmitting a control signal. The remain portion of each subframe is a region available as a physical uplink shared channel (PUSCH) for mainly transmitting user data.

Operation Environment According to Embodiment

Figure 5:
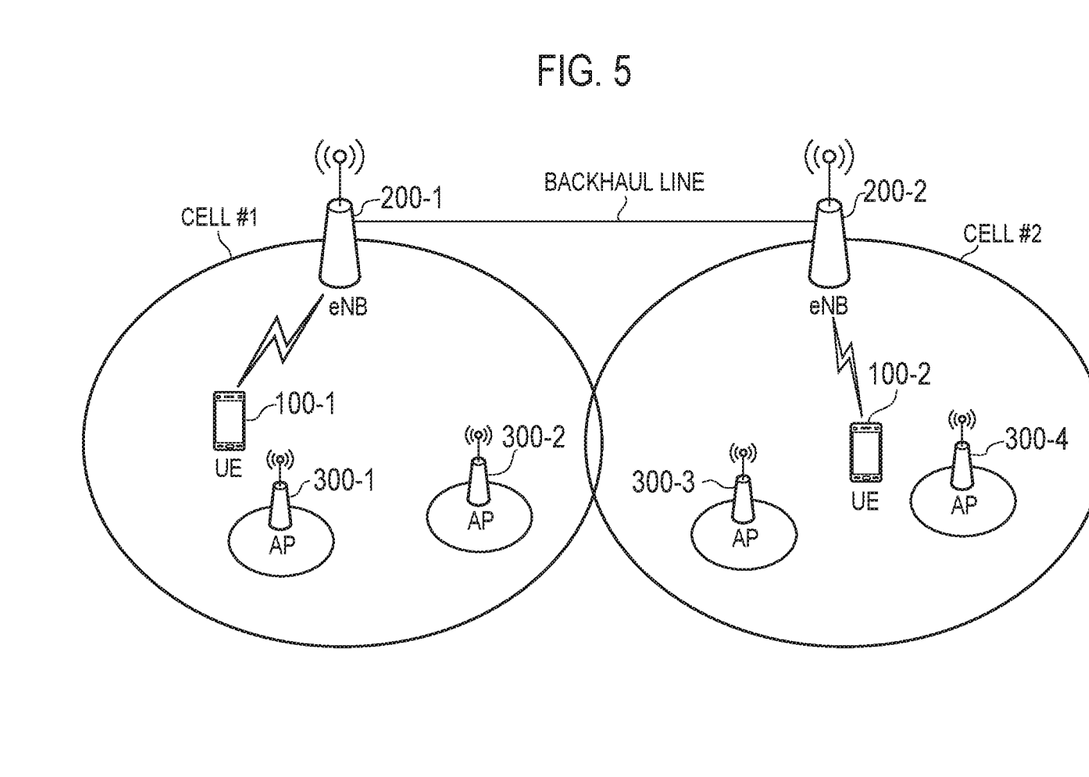
FIG. 5 is a diagram showing an operation environment according to the embodiment.

An operation environment according to the embodiment will be described next. FIG. 5 is a diagram showing an operation environment according to the embodiment.

As shown in FIG. 5, a plurality of APs 300 (an AP 300-1 and an AP 300-2) are arranged within a coverage of a cell #1 managed by an eNB 200-1. The eNB 200-1 corresponds to a first base station, and the cell #1 corresponds to a first cell.

A UE 100-1 exists in a coverage of the cell #1. The UE 100-1 is connected to the eNB 200-1, and exchanges traffic (user data) with the eNB 200-1. In a real environment, a plurality of UEs 100-1 may be connected to the eNB 200-1.

In addition, a plurality of APs 300 (an AP 300-3 and an AP 300-4) are arranged within a coverage of a cell #2 managed by an eNB 200-2. The eNB 200-2 communicates with the eNB 200-1 via a backhaul line such as an X2 interface. The eNB 200-2 corresponds to a second base station, and the cell #2 corresponds to a second cell. The cell #2 is a cell neighboring the cell #1.

The UE 100-2 exists in a coverage of the cell #2. The UE 100-2 is connected to the eNB 200-2, and exchanges traffic (user data) with the eNB 200-2. In a real environment, a plurality of UEs 100-2 may be connected to the eNB 200-2.

It is assumed that in such an operation environment, the cell #1 is in a crowded state (a traffic congestion state). Here, by performing switching (traffic steering) so as to turn the traffic of the UE 100-1 that is accommodated in the eNB 200-1, to the APs 300 (AP 300-1 and AP 300-2), a traffic load in the eNB 200-1 can be reduced (that is, offloaded). The traffic steering includes a case where a connection destination of the UE 100 is switched between the eNB 200 and the AP 300, and a case where at least a part of a data path is switched between the eNB 200 and the AP 300 while the UE 100 is connected to both the eNB 200 and the AP 300.

Each UE 100 performs network selection for selecting, from an E-UTRAN 10 and a WLAN 30, an access network in which the traffic of the UE 100 itself is transmitted and received, on the basis of, for example, a network selection rule specified beforehand. For example, a network selection rule is a rule according to which traffic steering is performed for the WLAN 30 when the "RAN measurement value<A, and the WLAN measurement value>B", and "Offload is requested". The network selection rule may be provided from an ANDSF server.

The eNB 200 transmits, to the UE 100, RAN auxiliary information applicable to such a network selection rule. The RAN auxiliary information, for example, includes load information related to the load level of the eNB 200 itself, and a threshold value (such as the above-described "A" and "B") that is compared to the RAN measurement value and/or the WLAN measurement value.

The load information is information indicating the load level of the eNB 200, or information indicating that an offload is requested. That is, the load information is information for directly or indirectly requesting an offload (that is, switching the access network in which traffic is transmitted and received to the WLAN 30) to the UE 100. Hereinafter, such information (the load information) requesting an offload is called "offload control information".

(Network Selection Control Method)

A network selection control method according to the embodiment will be described below.

The network selection control method according to the embodiment is a method for selecting, from the E-UTRAN 10 and the WLAN 30, an access network in which the traffic of a user terminal is transmitted and received. The network selection control method comprises the steps of: transmitting, by a cell #1 in the E-UTRAN 10, to a UE 100-1 that exists in the cell #1, offload control information for requesting switching of an access network in which the traffic of the UE 100-1 is transmitted and received, to the WLAN 30; and transmitting, by a cell #2 neighboring the cell #1 in the E-UTRAN 10, to a UE 100-2 that exists in the cell #2, neighboring cell offload information indicating that the offload control information is transmitted in the cell #1.

Here, the cell #1 that transmits the offload control information is in a crowded state. The cell #2 neighboring the cell #1 transmits, to the UE 100-2, the neighboring cell offload information indicating that the offload control information is transmitted in the cell #1. As a result, it becomes possible to start an offload-related process in the UE 100-2 at a stage prior to a handover performed by the UE 100-2 from the cell #2 to the cell #1. Therefore, an increase in the load level of the cell #1 can be prevented. It is noted that the offload-related process is at least one of scanning of the AP 300, selection of an access network (network selection), transmission of a WLAN measurement report, and switching of traffic (traffic steering).

The network selection control method according to the embodiment further comprises a step of starting an offload-related process for switching an access network in which the traffic of the UE 100-2 is transmitted and received, to the WLAN 30, on the basis of reception of the neighboring cell offload information by the UE 100-2. After receiving the neighboring cell offload information from the cell #2, the UE 100-2 starts the offload-related process at a timing that is immediately before performing a handover to the cell #1 (for example, a timing of handover preparation). Alternatively, the UE 100-2 starts the offload-related process at a timing of receiving the neighboring cell offload information from the cell #2. As a result, it is possible to start the offload-related process in the UE 100-2 at an appropriate timing.

The network selection control method according to the embodiment further comprises a step of transmitting, by the eNB 200-1 that manages the cell #1, to the eNB 200-2 that manages the cell #2, a notification concerning the start of transmission of the offload control information (hereinafter, "an offload start notification"). In response to the reception of the offload start notification, the eNB 200-2 starts the transmission of the neighboring cell offload information from the cell #2. Although the offload start notification may be transmitted either before or after the eNB 200-2 transmits the offload control information from the cell #1, the offload start notification is preferably transmitted before the eNB 200-2 transmits the offload control information from the cell #1.

In an operation pattern 1 according to the embodiment, in the step of transmitting the neighboring cell offload information, the cell #2 transmits the neighboring cell offload information by a broadcast signal. The broadcast signal, for example, is a System Information Block (SIB), which is a type of a common RRC message.

In the operation pattern 1 according to the embodiment, the network selection control method further comprises a step of transmitting, by the cell #2, a threshold value for starting the offload-related process for switching the access network in which the traffic of the UE 100-2 is transmitted and received, to the WLAN 30, together with the neighboring cell offload information. In the UE 100-2, the threshold value is compared to the received power from the cell #1. As a result, when it is determined that the UE 100-2 comes close to the cell #1, and performs a handover to the cell #1, the offload-related process can be started in the UE 100-2.

In an operation pattern 2 according to the embodiment, in the step of transmitting the neighboring cell offload information, the cell #2 transmits the neighboring cell offload information to the UE 100-2 that satisfies a predetermined condition, by a unicast signal. The unicast signal is, for example, an individual RRC message. The predetermined condition is either the fact that a handover is performed from the cell #2 to the cell #1, or the fact that the probability of performing a handover is high.

In the operation pattern 2 according to the embodiment, the network selection control method further comprises the steps of: receiving, by the cell #2, from the UE 100-2, a measurement report including a measurement result for the cell #1; determining, by the cell #2, whether or not the UE 100-2 satisfies a predetermined condition, on the basis of the measurement report; and transmitting, by the cell #2, to the UE 100-2, an instruction for an offload-related process for switching an access network in which the traffic of the UE 100-2 is transmitted and received, to the WLAN 30, as the neighboring cell offload information, when the predetermined condition is satisfied. As a result, when it is determined that the UE 100-2 comes close to the cell #1, and performs a handover to the cell #1, the offload-related process can be started in the UE 100-2.

Specific Examples of Operation Patterns 1 and 2

Specific examples of operation patterns 1 and 2 according to the embodiment will be described below.

Figure 6:
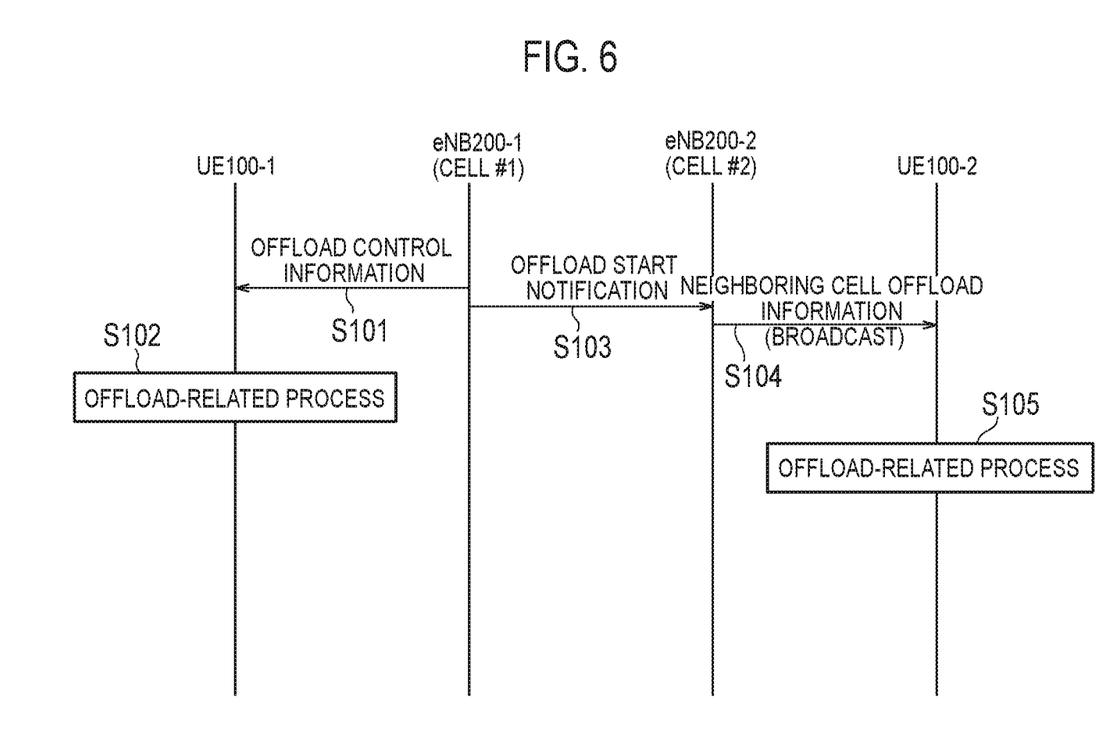
FIG. 6 is a sequence diagram showing a specific example of an operation pattern 1 according to the embodiment.

As described above, in the operation pattern 1, the neighboring cell offload information is transmitted by a broadcast signal. FIG. 6 is a sequence diagram showing a specific example of the operation pattern 1 according to the embodiment. In an initial state shown in FIG. 6, the UE 100-1 establishes a connection with the eNB 200-1, and the UE 100-2 establishes a connection with the eNB 200-2. Further, it is assumed that the eNB 200-1 (cell #1) is in a crowded state.

As shown in FIG. 6, in step S101, the eNB 200-1 transmits, to the UE 100-1, the offload control information for requesting an offload.

In step S102, the UE 100-1 that receives the offload control information starts an offload-related process on the basis of the received offload control information.

In step S103, the eNB 200-1 transmits an offload start notification to the eNB 200-2. The offload start notification includes load information related to a load level of the eNB 200-1. The load information is information indicating the load level of the eNB 200, or information indicating that an offload is requested. Information indicating the load level is either information indicating the percentage of the load level, or information indicating the classification (such as high, medium, or low) of the load level. Further, the offload start notification may include a threshold value (such as the above-described "A" and "B") that is compared to a RAN measurement value and/or a WLAN measurement value.

In step S104, the eNB 200-2 that receives the offload start notification transmits, to the UE 100-2, the neighboring cell offload information by a broadcast signal, on the basis of the received offload start notification. Further, the eNB 200-2 transmits a threshold value for starting the offload-related process together with the neighboring cell offload information, by a broadcast signal. The threshold value may be included in the neighboring cell offload information.

In step S105, the UE 100-2 that receives the neighboring cell offload information (and the threshold value) measures the received power (RSRP: Reference Signal Received Power) of the cell #1, which is an neighboring cell, and compares the measured received power with the threshold value. When the received power exceeds the threshold value, the UE 100-2 starts the offload-related process.

Figure 7:
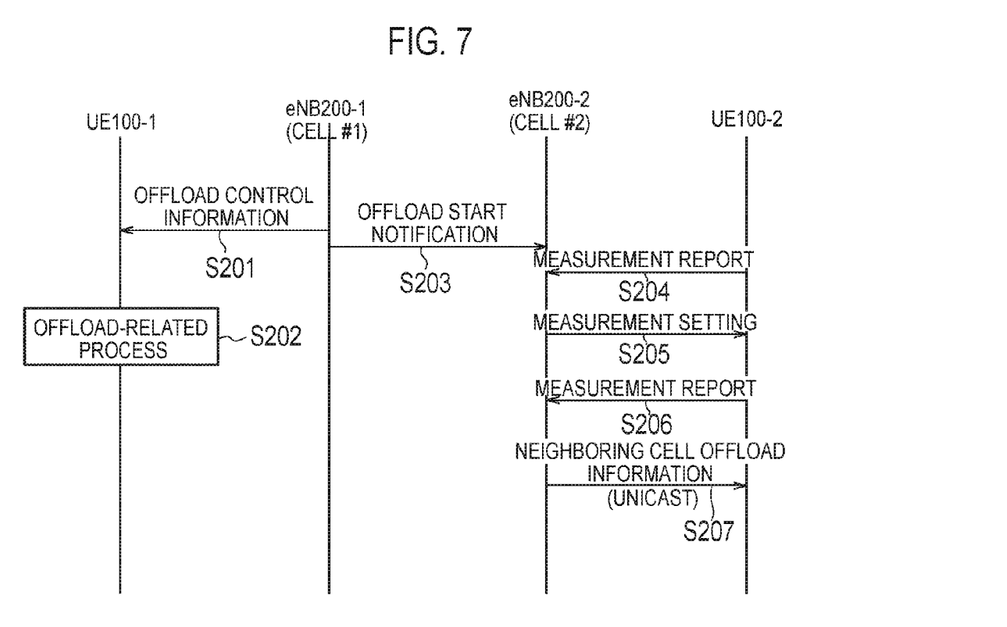
FIG. 7 is a sequence diagram showing a specific example of an operation pattern 2 according to the embodiment.

A specific example of the operation pattern 2 according to the embodiment will be described next. As described above, in the operation pattern 2, the neighboring cell offload information is transmitted by a unicast signal.

FIG. 7 is a sequence diagram showing a specific example of the operation pattern 2 according to the embodiment. In an initial state shown in FIG. 7, the UE 100-1 establishes a connection with the eNB 200-1, and the UE 100-2 establishes a connection with the eNB 200-2. Further, it is assumed that the eNB 200-1 (cell #1) is in a crowded state.

As shown in FIG. 7, in step S201, the eNB 200-1 transmits, to the UE 100-1, the offload control information for requesting an offload.

In step S202, the UE 100-1 that receives the offload control information starts an offload-related process on the basis of the received offload control information.

In step S203, the eNB 200-1 transmits an offload start notification to the eNB 200-2. Information elements included in the offload start notification are similar to those the operation pattern 1. The eNB 200-2 receives the offload start notification.

In step S204, the eNB 200-2 receives, from the UE 100-2, a measurement report including the measurement result (such as the received power) for the cell #1. It is assumed that the measurement report is, for example, a periodic measurement report.

In step S205, in order to determine whether or not the UE 100-2 comes close to the cell #1, the eNB 200-2 transmits, to the UE 100-2, a measurement setting for setting an event trigger type measurement report. The measurement setting includes a threshold value that is compared to the received power of the cell #1, for example.

In step S206, the UE 100-2 that receives the measurement setting measures the received power (the RSRP) of the cell #1 on the basis of the received measurement setting, and compares the measured received power with the threshold value. When the received power exceeds the threshold value, the UE 100-2 transmits, to the eNB 200-2, the event trigger type measurement report. Here, the transmission of the measurement report implies the fact that a handover is performed from the cell #2 to the cell #1 (or the fact that the probability of performing a handover is high).

In step S207, the eNB 200-2 that receives the measurement report transmits, to the UE 100-2, the neighboring cell offload information by a unicast signal, on the basis of the received measurement report. The neighboring cell offload information can be considered as an instruction for starting the offload-related process. The eNB 200-2 may include the neighboring cell offload information in a handover command for instructing a handover to the cell #1. In this case, step S204 is not essential and thus may be omitted. The UE 100-2 that receives the neighboring cell offload information starts the offload-related process.

Figure 8:
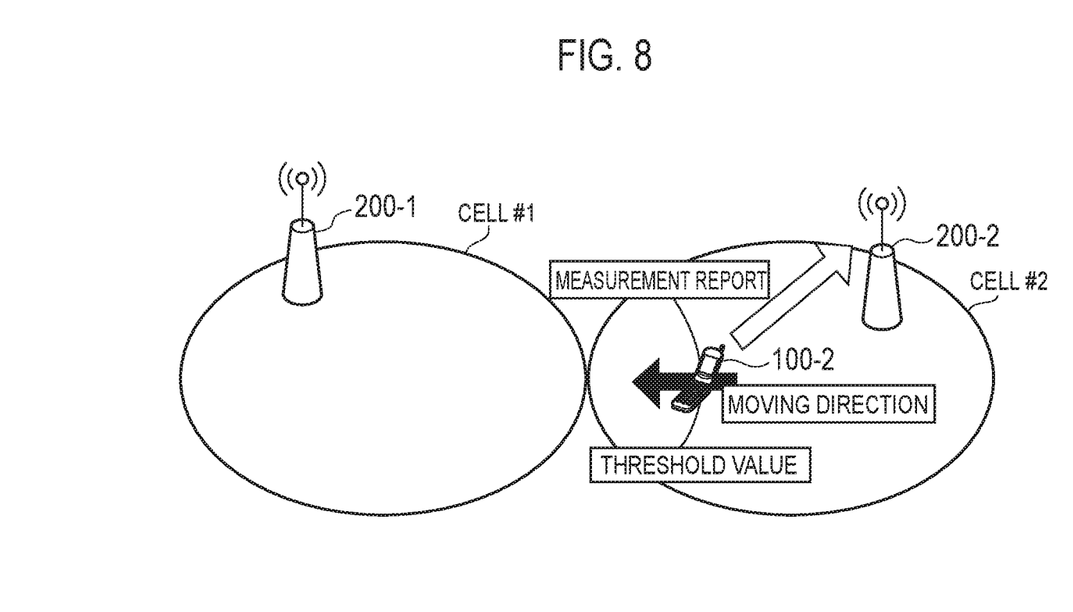
FIG. 8 is a diagram for describing a threshold value in operation patterns 1 and 2 according to the embodiment.

Next, the threshold value in the operation patterns 1 and 2 will be described. FIG. 8 is a diagram for describing a threshold value in the operation patterns 1 and 2.

As shown in FIG. 8, the UE 100-2 moves to the cell #1. The threshold value is set so as to become same as the value of the received power in the vicinity of the cell #1 (the eNB 200-1) in the cell #2. Thus, when the received power of the cell #1 measured by the UE 100-2 exceeds the threshold value, it can be determined that the UE 100-2 is in a state close to the cell #1.

Thus, in the above-described operation pattern 1, when the UE 100-2 comes close to the cell #1, the UE 100-2 can autonomously start the offload-related process. Further, in the above-described operation pattern 2, when the UE 100-2 comes close to the cell #1, the UE 100-2 transmits a measurement report to the eNB 200-2, and the UE 100-2 can start the offload-related process based on an instruction from the eNB 200-2.

[Modification]

Figure 9:
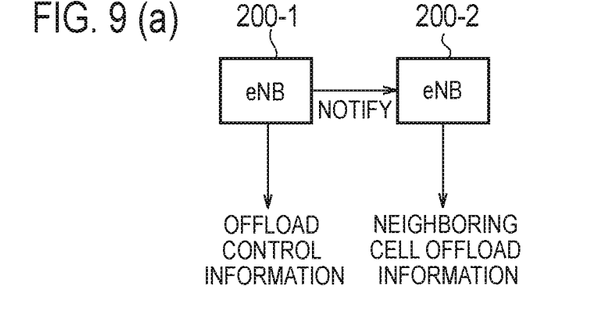

In above-described embodiment, a case in which the eNB 200-1 and the eNB 200-2 are general eNBs is illustrated. A general eNB is, for example, a macro eNB that manages a macro cell. However, similar to the AP 300, an HeNB (home base station) is preferably used for offloading a macro cell. Therefore, the above-described embodiment is changed partially. FIGS. 9 (a) to 9 (c) are diagrams for describing a modification of the embodiment.

As shown in FIG. 9 (a), in a case in which the eNB 200-1 and the eNB 200-2 are general eNBs, the above-described embodiment is applicable as is.

In contrast, as shown in FIG. 9 (b), in a case in which the eNB 200-1 is an HeNB, the eNB 200-1 is prohibited from transmitting the offload control information, and also transmitting the offload start notification. In other words, an HeNB does not have a function of transmitting the offload control information, and a function of transmitting an offload start notification.

However, as shown in FIG. 9 (c), in a case in which the eNB 200-2 is an HeNB, the eNB 200-2 can receive an offload start notification, and can also transmit the neighboring cell offload information. In other words, an HeNB has a function of receiving the offload control information, and a function of transmitting the neighboring cell offload information.

Other Embodiments

In the above-described embodiment, the description is mainly focused on an offload start notification transmitted by the eNB 200-1, however, in response to termination of the offload, the eNB 200-1 may transmit an offload termination notification concerning an offload termination, to the eNB 200-2. The eNB 200-2 that receives the offload termination notification stops the transmission, etc. of the neighboring cell offload information.

Further, in the above-described embodiment, the load information is used as offload control information. However, a case in which an offload is requested indirectly to the UE 100 by adjusting a threshold value compared to a RAN measurement value and/or a WLAN measurement value is also assumed. In such a case, the threshold value also corresponds to the offload control information.

In addition, in the above-described embodiment, a case in which the cell #1 and the cell #2 are managed by different eNBs 200 is illustrated; however, the cell #1 and the cell #2 may be managed by the same eNB 200.

In the above-described embodiment, as one example of a cellular communication system, the LTE system is described; however, the present invention is not limited to the LTE system, and the present invention may be applied to systems other than the LTE system.

The entire content of Japanese Patent Application No. 2014-030469 (filed on Feb. 20, 2014) is incorporated in the present specification by reference.

INDUSTRIAL APPLICABILITY

The present invention is useful in the field of radio communication.

The invention claimed is:

1. A network selection control method for selecting, from a cellular Radio Access Network (RAN) and a wireless Local Area Network (LAN), an access network in which a traffic of a user terminal is transmitted and received, comprising:
- transmitting, by a first cell in the cellular RAN, offload control information to a first user terminal that exists in the first cell, the offload control information being for requesting switching of an access network in which the traffic of the first user terminal is transmitted and received, to the wireless LAN; and
- transmitting, by a second cell neighboring the first cell in the cellular RAN, to a second user terminal that exists in the second cell, neighboring cell offload information indicating that the offload control information is transmitted in the first cell,
- in the transmitting the neighboring cell offload information, the second cell transmits, to the second user terminal, a threshold value for starting an offload-related process for switching an access network in which the traffic of the second user terminal is transmitted and received, to the wireless LAN, together with the neighboring cell offload information.

2. The network selection control method according to claim 1, further comprising
- starting an offload-related process for switching an access network in which the traffic of the second user terminal is transmitted and received, to the wireless LAN, on the basis of reception of the neighboring cell offload information by the second user terminal.

3. The network selection control method according to claim 1, further comprising
- transmitting, by a first base station that manages the first cell, to a second base station that manages the second cell, a notification concerning the start of transmission of the offload control information, wherein
- in response to the reception of the notification, the second base station starts the transmission of the neighboring cell offload information from the second cell.

4. The network selection control method according to claim 1, wherein
- a first base station that manages the first cell is a base station other than a home base station.

5. The network selection control method according to claim 1, wherein
- a second base station that manages the second cell is a home base station.

6. The network selection control method according to claim 1, wherein
- in the transmitting the neighboring cell offload information, the second cell transmits the neighboring cell offload information by a broadcast signal.

7. The network selection control method according to claim 1, wherein
- the threshold value is compared to a received power from the first cell in the second user terminal.

8. The network selection control method according to claim 1, wherein
- in the transmitting the neighboring cell offload information, the second cell transmits the neighboring cell offload information to the second user terminal that satisfies a predetermined condition, by a unicast signal.

9. The network selection control method according to claim 8, further comprising:
- receiving, by the second cell, from the second user terminal, a measurement report including a measurement result for the first cell;
- determining, by the second cell, whether or not the second user terminal satisfies the predetermined condition, on the basis of the measurement report; and
- transmitting, by the second cell, to the second user terminal, an instruction for an offload-related process for switching an access network in which the traffic of the second user terminal is transmitted and received, to the wireless LAN, as the neighboring cell offload information, when the predetermined condition is satisfied, wherein
- the predetermined condition is any one of the fact that a handover is performed from the second cell to the first cell and the fact that the probability of performing the handover is high.

10. A base station that manages a second cell neighboring a first cell in a cellular Radio Access Network (RAN), comprising:
- a transmitter configured to transmit, to a second user terminal that exists in the second cell, neighboring cell offload information indicating that offload control information is transmitted in the first cell, wherein
- the offload control information is information for requesting, to a first user terminal that exists in the first cell, switching of an access network in which the traffic of the first user terminal is transmitted and received, to the wireless Local Area Network (LAN), and
- the transmitter is configured to transmit, to the second user terminal, a threshold value for starting an offload-related process for switching an access network in which the traffic of the second user terminal is transmitted and received, to the wireless LAN, together with the neighboring cell offload information.

11. A user terminal that exists in a second cell neighboring a first cell in a cellular Radio Access Network (RAN), comprising:
- a receiver configured to receive, from the second cell, neighboring cell offload information indicating that offload control information is transmitted in the first cell; and
- a controller configured to start an offload-related process for switching an access network in which the traffic of the user terminal itself is transmitted and received, to the wireless Local Area Network (LAN), on the basis of reception of the neighboring cell offload information, wherein
- the offload control information is information for requesting, to a first user terminal that exists in the first cell, switching of an access network in which the traffic of the first user terminal is transmitted and received, to the wireless LAN,
- the receiver is configured to receive, from the second cell, a threshold value for starting an offload-related process for switching an access network in which the traffic of the second user terminal is transmitted and received, to the wireless LAN, together with the neighboring cell offload information.

* * * * *